Sept. 4, 1962 W. B. KANE 3,052,013
VALVE AND METHOD OF MANUFACTURE
Filed Oct. 15, 1957
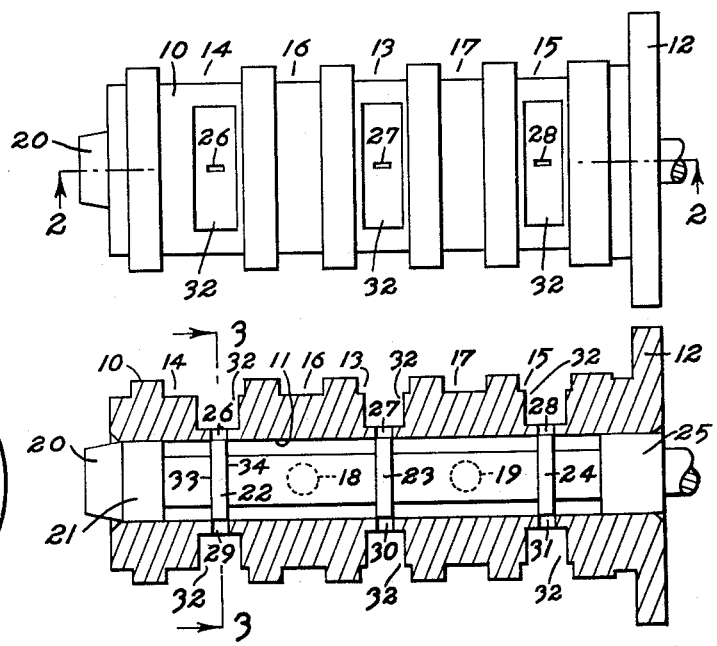
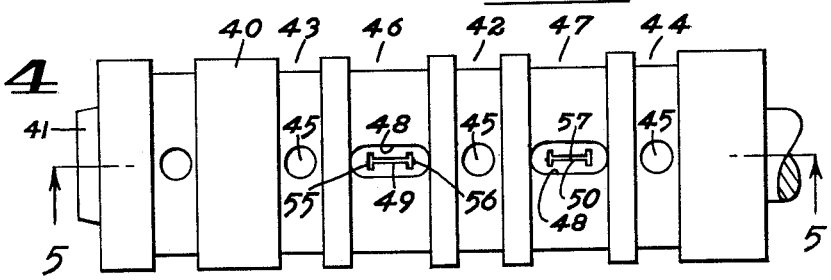
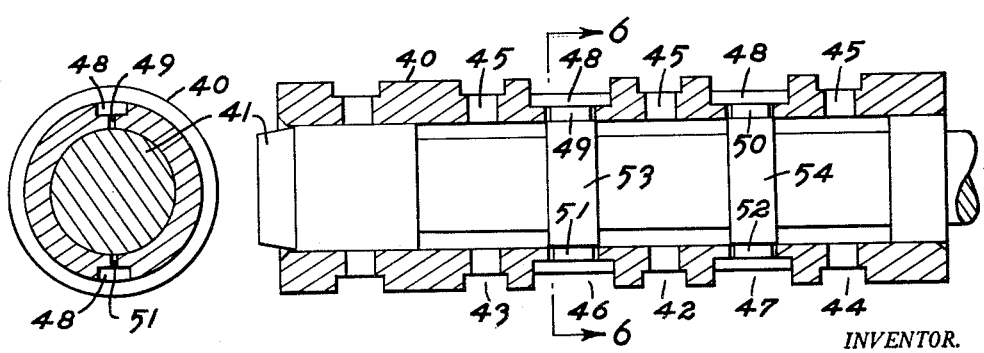
INVENTOR.
WILLIAM B. KANE
BY
*L. W. Wright & H. T. Kaiser*
ATTORNEYS.

United States Patent Office 3,052,013
Patented Sept. 4, 1962

3,052,013
VALVE AND METHOD OF MANUFACTURE
William B. Kane, Cincinnati, Ohio, assignor to The Cincinnati Milling Machine Co., Cincinnati, Ohio, a corporation of Ohio
Filed Oct. 15, 1957, Ser. No. 690,246
5 Claims. (Cl. 29—157.1)

This invention relates to a precision type control valve of novel design and to a new method of manufacturing the valve.

Spool type valves are extensively used in hydraulic circuits for controlling the flow of hydraulic fluid to utilization devices of one sort or another. The precision type control valves with which this invention is concerned consist, in each case, of a valve bushing having ports formed in the wall thereof, and a grooved spool slidable within the bushing for controlling the flow of fluid through the ports. These valves often form part of a servo system or other type of sensitive control system and must, therefore, provide precision control of the fluid flowing through the system. Also, in order to best suit the requirements of the entire system, the valves must be designed to have either linear flow characteristics or non-linear flow characteristics of a preselected character. In the past, it has been customary to use valves having round ports for this type of service since the ports were formed by a rotating tool, and no satisfactory method was known for fashioning ports of any other shape in the wall of the valve bushing. Round ports, however, are undesirable since they impose severe limitations on the design of the overall hydraulic system, and their enforced use has seriously handicapped the further development of hydraulic control and servo systems.

This will be more readily understood by considering the nature of the port opening provided by a round port as the same is uncovered by movement of the cooperating land on the valve spool. As the control edge of the land uncovers the control edge of the port it will provide a port opening which is in the form of a segment of a circle. The area of this opening does not bear a linear relation to the displacement of the spool and the flow characteristic provided by the round part is of a fixed, non-linear character. In the case of a rectangular port, or a square port, having sharp, right-angle corners, the area uncovered by the land as the spool is displaced is likewise rectangular in shape provided the control edge of the port lies parallel to the control edge of the land which uncovers it. The area of this port opening will, therefore, bear a linear relation to the displacement of the spool and the flow characteristic of the valve will also be linear.

Attempts have been made to produce rectangular-shaped ports by splitting the bushing in a transverse plane through the ports and then reuniting the bushing sections after the ports have been machined therein. This solution has not met with favor, however, due to the problem of alignment and the high cost of manufacture of bushings produced according to this method.

The present invention makes possible the economical manufacture of valves having ports of practically any desired configuration, thereby affording the systems engineer with much greater latitude in his circuit design. By suitable shaping of the ports, the flow characteristics of the control valve can be varied as desired, and superior results can be achieved by designing the valve ports to suit the requirements of a particular control system. For example, in a rate and direction valve of the type used in the 360 degree tracer control circuit shown in Roehm Patent No. 2,332,533, it is necessary to maintain the rate of flow through the valve linear with respect to valve displacement if accurate tracing of the pattern is to be effected. This is particularly true in the crossover region where one valve reverses the direction of flow to one of the hydraulic motors operating a slide. By following the teachings of the present invention, it is now possible to achieve this requirement by providing the rate and direction valve of the Roehm patent with rectangular ports having square cornered ends which preserve the linearity of flow with valve displacement in the region where the ports just begin to open. This is the critical area of operation for valves used in this system, and in a subsequent portion of this specification, a particular form of valve port which is ideally suited for this type of service will be described.

Another commonly used type of valve is the so-called servo valve which forms a part of a hydraulic servo system in which the valve serves to control the operation of a hydraulic motor which in turn drives a slide or other form of load. In servo systems it is important that the velocity error of the system be kept as small as possible, and, in this connection it has been found that a valve having T-shaped ports provides the type of flow characteristics necessary to minimize this error. A particular form of valve port which has been found very satisfactory for this purpose will be described in a later portion of this specification.

Accordingly, it is an object of the present invention to provide a new method of valve manufacture whereby a spool type valve of superior quality may be obtained.

Another object of the invention is to provide a novel method of manufacturing spool type valves whereby any desired type of flow characteristics may be imparted to the valve with a high degree of precision.

Another object of the invention is to provide a novel method of manufacturing bushing type spool valves in which the spool is first lapped into the bushing after which the ports are cut therein.

Another object of the invention is to provide a new method of manufacturing bushing type spool valves in which ports of any desired shape may be cut in the wall of the bushing by the use of a non-rotating tool having a cross sectional configuration corresponding to the desired shape of the ports.

Another object of the invention is to provide, in a one-piece valve bushing, a port of a preselected non-circular configuration intermediate the ends of the bushing.

Another object of the invention is to provide, in a one-piece valve bushing, a non-circular port intermediate the ends of the bushing having side walls which are defined by a series of parallel lines.

Another object of the invention is to provide, in a one-piece valve bushing, a square cornered port disposed intermediate the ends of the bushing and having its major dimension extending longitudinally of the bushing.

With these and other objects in view, which will become more apparent from the following description, the invention includes certain novel features of design and methods of construction, the essential elements of which are set forth in the appended claims, and a preferred form or embodiment of which will hereinafter be described with reference to the drawings which accompany and form a part of this specification.

In the drawings:

FIG. 1 is a plan view of a spool type valve provided with ports made in accordance with the teachings of the present invention.

FIG. 2 is a cross-sectional view of the valve taken along the line 2—2 of FIG. 1.

FIG. 3 is a cross-sectional view taken along the line 3—3 of FIG. 2.

FIG. 4 is a plan view of a modified form of spool type valve provided with ports made in accordance with teachings of the present invention.

FIG. 5 is a cross-sectional view of the valve taken along the line 5—5 in FIG. 4.

FIG. 6 is a cross-sectional view taken along the line 6—6 in FIG. 5.

The method utilized in making valves having ports of any desired configuration includes a new mode of procedure which enables valves of improved character to be manufactured on an economical basis. The new method involves a rearrangement of the steps heretofore followed in the manufacture of valves which leads to improve accuracy and precision in the final product.

In the past it has been customary when making bushing type spool valves to proceed as follows: the ports are first drilled in the valve bushing, after which the bore in the bushing is internally ground or reamed to size. The valve spool in then lapped into the bushing to provide a non-leaking, sliding fit after which the valve is calibrated. In accordance with this method, the burr or rough edge left by the drill on the inside wall of the bushing is removed by the grinding or reaming operation. However, when the spool is thereafter lapped into the bushing, the lapping compound tends to cut more rapidly around the edges of the ports, thereby causing rounding of the corners of the control edges of the ports. Hence, the control edges, instead of being sharp and precise, are rounded and thereby produce a graduated cut-off as the control edges on the lands of the spool move to close off the ports. This affects the linearity of the valve.

In accordance with the teachings of the present invention, the bushing is reamed and lapped before the ports are cut therein, thereby eliminating this problem. Accordng io the new method of valve manufacture, the spool is lapped into the reamed hole in the bushing to provide the desired non-leaking, sliding fit between the lands of the spool and the inner wall of the bushing. The ports are then cut in the bushing by a process whereby the metal is eroded from the wall of the bushing by a non-rotating tool to form ports of the desired shape and size at the proper locations. One type of eroding process which has been found satisfactory for this purpose is the spark machining method in which a spark discharge is caused to occur between the tool and the work. In this type of machining process, the sparking between the tool and the work dislodges small particles of the metal from the work and erodes a hole therein having the same shape as the tool. Hence, by suitably shaping the tool beforehand, it is possible to form holes of any desired configuration in the work.

By the use of an erosion process to cut the ports in the valve bushing, it is possible to cut the holes in the bushing as a final operation before calibration. This results from the fact that the burr formed on the inner wall of the bushing by the erosion process of machining is so minute that no special operation is necessary to remove this burr prior to calibrating the valve. In fact, the mere insertion of the spool into the bushing is effective to shear off any burr which is present, and no further procedures are required to smooth up the whole. It is thereby possible, with the new method of valve manufacture, to produce a valve in which sharp and precise ports of any desired configuration may be made with a tool having a similar shape. Hence, ports with square corners may be as readily cut as any other type, and rounding of the square corners of the port may be kept negligibly small by first roughing the hole with an undersized tool and heavy current and finishing the hole with a finish size tool and a light current. Since the tool is fed into the work along its longitudinal axis, the resulting port will have parallel side walls, thereby reducing the likelihood of clogging of the port by particles of metal in the hydraulic fluid.

In the drawings are shown two examples of bushing type spool valves having valve ports produced in accordance with the above-described method. The valve shown in FIGS. 1 to 3, inclusive, is a rate and direction valve suitable for use in the 360 degree tracer control system shown in the Roehm Patent No. 2,332,533. In this valve, the bushing 10 is of one piece construction and may be made of any desired metal. The bushing is provided with a longitudinally extending bore 11 and has a mounting flange 12 formed on one end thereof by which it may be secured in the body of the valve (not shown). The exterior surface of bushing 10 is provided with circumferentially extending channels or grooves which communicate with drilled holes in the valve body through which the hydraulic fluid is transferred to and from the valve. In the valve shown in FIGS. 1 to 3, inclusive, fluid under pressure is supplied to a central groove 13 while the end grooves 14 and 15 are connected to reservoir. The intermediate grooves 16 and 17 are connected to the hydraulic motor which is reversibly controlled by the valve. Holes 18 and 19 are drilled in the wall of the bushing to communicatively connect the internal bore of the bushing with the outside grooves 16 and 17.

The bushing 10 is fitted with a spool 20 having lands 21, 22, 23, 24, and 25 formed thereon. As previously mentioned, the bore 11 in the bushing is reamed or ground to size, and the spool, whose lands are ground to provide a snug fit with the bore 11, is lapped into the bore to provide a non-leaking sliding fit between the lands and the bore. Thereafter, ports 26, 27, and 28 are cut in the bushing by a spark machining process with the non-rotating electrode or tool entering the bushing from the top side thereof as viewed in FIG. 2. Ports 29, 30, and 31, located opposite the ports 26–28, may also be cut in the bushing in a similar manner, these ports being cut by entry of the tool from the bottom side of the bushing as viewed in FIG. 2. The ports are cut by a tool having a cross-sectional configuration corresponding to that of the port openings so that as the tool is moved inwardly, the electrical discharges taking place between the tool and the bushing will cause a hole of corresponding shape to be formed therein.

It is preferable to reduce the thickness of the bushing in the vicinity of the ports, this being accomplished by cutting slots 32 transversely of the axis of the bushing as shown in the drawings. This reduces the amount of metal which must be eroded from the wall of the bushing to form the ports, and it also provides ports having thin side walls which produce turbulence, thereby reducing the effects of viscosity on the flow of fluid through the valve so as to achieve temperature stability.

The lands 22, 23, and 24 may be of a width equal to, less than, or greater than the length of the ports to provide zero lap, underlap, or overlap of the ports as may be desired. In accordance with conventional practice, the desired lap is provided during the calibration operation at which time the control edges 33 and 34 on each of the lands 22, 23, and 24 are adjusted to give the lap required.

As shown in FIG. 1 of the drawings, the ports 26, 27, and 28 are rectangular in shape and have sharp, square corners which are provided by rough and finish machining of the ports as previously described. By following the herein described method of lapping the valve spool into the bushing before the parts are cut therein, it is possible to provide, sharp, precise control edges on the ports in the bushing, these edges being formed by the intersection of the side walls of the ports with the surface of the bore 11. Also, as noted from FIGS. 2 and 3, the side walls of the ports are parallel throughout their entire length, thereby providing the most desirable type of ports. Since the ports are rectangular, and since the ends of the ports are straight and lie in planes which are parallel to the planes containing the control edges 33 and 34 on the lands cooperating therewith, it will be apparent that the valve will have a linear characteristic in all positions of the spool, including its neutral position, which is of utmost importance in valves employed in the 360 degree tracer control circuit described in the Roehm patent.

A further example of a valve made in accordance with the present invention is illustrated by the servo valve shown in FIGS. 4 to 6, inclusive. In this embodiment, a valve bushing 40 which is adapted to be received in a valve body (not shown) is fitted with a spool 41 which, in accordance with the teachings of the present disclosure, is lapped into the bushing before the ports are cut therein. The exterior surface of the bushing is provided with the customary circumferential communication grooves, the groove 42 being connected to pressure, and the grooves 43 and 44 to reservoir. Drilled holes 45 provide communication between the grooves 42, 43, and 44 and the internal bore in the bushing. The hydraulic motor lines communicate with grooves 46 and 47, which contain recesses 48 cut part way through the wall of the bushing in the zone of the ports to reduce the thickness of the metal in this area.

If desired, the recesses may be cut by the same spark machining process which is used to cut the ports. In such case it is preferable to make each recess approximately the same shape as its associated port but slightly larger in size so as to provide a step or shoulder where the bottom of the recess connects with the top of the port. This is productive of a stronger bushing since less metal is removed. It has been found that a shoulder .040 of an inch wide will produce a recess of sufficient size to provide the desired temperature stability to the valve. Ports 49, 50, 51, and 52 are cut through the wall of the bushing in the bottom of each recess 48 by the process of eroding the metal from the wall of the bushing with a tool having the same configuration as the ports. These ports cooperate with the lands 53 and 54 provided on the spool 41 and are made of appropriate width to provide the desired conditions of lap with respect to the terminal edges 55 and 56 of the ports. In the present instance, the ports are provided with square corners, and the control edges produced by the side walls 55 and 56 at each end thereof lie in planes parallel to the planes containing the cooperating control edges on the lands of the spool. Hence, a linear flow characteristic is provided by the T-head section of each port. After the spool has been moved a sufficient distance to uncover the slot 57, the increase of flow through the valve per unit of distance moved by the spool is reduced, thereby reducing the sensitivity of the system. This is advantageous since it increases the stability of the system and reduces the tendency for the system to oscillate. The T-head portion is effective to reduce the velocity error which is an undesirable factor present in all servo systems.

Since it is comparatively easy to shape a tool or electrode to any desired cross-sectional configuration, it is possible to cut any desired shape of port in a valve bushing by the use of this method. Hence, the valve can readily be designed to provide the flow characteristics which are required to adapt the valve to any particular system. Also, by this method, a higher degree of accuracy can be obtained, both as to the size and shape of the ports and also as to the cross alignment of the ports (i.e., locating port 29 directly opposite port 26, etc.) than by the use of any previously known method. Hence, the teachings of the present invention are of very considerable value in the manufacture of miniaturized hydraulic equipment which is finding ever increasing use in the aircraft and guided missile industries. In this type of equipment, not only must the valve ports be made proportionately smaller in size than in the larger valves, but, also, the allowable error which may be permitted in the manufacture of the valves is reduced to a like degree. It is customary practice, therefore, to specify critical dimensions of miniature type valves to within one or two ten thousandths of an inch. With the prior art methods of manufacture this has been difficult of accomplishment, and the problem of holding the cross alignment of the ports to this sort of tolerance has been especially troublesome. It will be found, however, that by employing the teachings of the present disclosure this is no longer a serious problem, and the manufacture of valves to this degree of accuracy can be readily achieved on a production basis with only a normal percentage of rejects. Hence, it is economically feasible with the new method of manufacture described herein, to fashion precision control valves having greatly improved characteristics both as to the nature of the flow through the valve and also as to the accuracy with which the flow is controlled by small displacements of the valve.

While I have described my invention in connection with one possible form or embodiment thereof and have used, therefore, certain specific terms and language herein, it is to be understood that the present disclosure is illustrative rather than restrictive and that changes and modifications may be resorted to without departing from the spirit of the invention or the scope of the claims which follow.

I claim:

1. The method of manufacturing metal bushing type spool valves which comprises the steps of lapping the valve spool into the bore of the valve bushing with an abrasive compound to provide a substantially non-leaking, sliding fit, and thereafter cutting ports in the wall of the bushing by removing the metal therefrom to form a port opening of the desired shape and size, said cutting being effected by passing electrical discharges across the gap between a non-rotating electrode and the wall of the bushing, said electrode having a cross-sectional configuration corresponding to the desired shape of the ports.

2. The method of manufacturing metal bushing type spool valves which comprises the steps of lapping the valve spool into the bore of the valve bushing with an abrasive compound to provide a substantially non-leaking, sliding fit, and thereafter cutting square-cornered ports in the wall of the bushing by removing the metal therefrom to form a port opening of the desired shape and size, said cutting being effected by a non-rotating electrode and the wall of the bushing, said electrode having a square-cornered cross-sectional configuration corresponding to the desired shape of the ports.

3. The method of manufacturing metal bushing type spool valves which comprises the steps of lapping the lands on the valve spool into the bore of the valve bushing with an abrasive compound to provide a substantially non-leaking, sliding fit, and thereafter cutting ports in the wall of the bushing by removing the metal therefrom to form a port opening of the desired shape and size, said cutting being effected by electric spark erosion of the metal from the wall of the bushing with a non-rotating electrode having a cross-sectional configuration corresponding to the desired shape of the ports with each port having at least one control edge thereof located parallel to the cooperating control edge on a land of the spool to thereby provide precise control of the flow of hydraulic fluid through the valve.

4. The method of manufacturing metal bushing type spool valves which comprises the steps of finishing the inside diameter of the valve bushing to form therein a round, straight hole of suitable surface finish, fiinishing the outside diameter of the lands on the valve spool to provide a snug fit of the spool in the finished hole in the bushing, then lapping the spool into the hole in the bushing with an abrasive compound to provide a substantially non-leaking, sliding fit, and finally cutting ports in the wall of the bushing by removing the metal therefrom to form a port opening of the desired shape and size, said cutting being effected by electric spark erosion of the metal from the wall of the bushing with a non-rotating electrode having a cross-sectional shape corresponding to the desired configuration of the ports.

5. The valve manufacturing method of claim 4 including the step of removing metal from the wall of the valve bushing in the zone of the port before the port is cut therein so as to form a cavity extending part way through the wall of the bushing whereby the side walls of the port are reduced in thickness without impairing the strength of the bushing.

References Cited in the file of this patent

UNITED STATES PATENTS

| | | |
|---|---|---|
| 2,536,965 | Taylor | Jan. 2, 1951 |
| 2,669,011 | Brumbaugh | Feb. 16, 1954 |
| 2,705,829 | Mock | Apr. 12, 1955 |
| 2,818,490 | Dixon | Dec. 31, 1957 |
| 2,822,783 | Clifton et al. | Feb. 11, 1958 |
| 2,882,866 | Floyd | Apr. 21, 1959 |

UNITED STATES PATENT OFFICE
CERTIFICATE OF CORRECTION

Patent No. 3,052,013            September 4, 1962

William B. Kane

It is hereby certified that error appears in the above numbered patent requiring correction and that the said Letters Patent should read as corrected below.

Column 6, line 45, after "by" insert -- passing electrical discharges across the gap between --.

Signed and sealed this 5th day of March 1963.

(SEAL)
Attest:

ESTON G. JOHNSON
Attesting Officer

DAVID L. LADD
Commissioner of Patents